(12) United States Patent
Hickerson et al.

(10) Patent No.: US 12,104,745 B2
(45) Date of Patent: Oct. 1, 2024

(54) MOUNTING FLANGE AND BRACKET FOR A SPACE HABITAT

(71) Applicant: Sierra Space Corporation, Broomfield, CO (US)

(72) Inventors: Jeffrey S. Hickerson, Erie, CO (US); Mariusz Erni Pecherzewski, Longmont, CO (US); Charles Ralph Sandy, Camden, DE (US); Jeffrey Robert Valania, Erie, CO (US); Grant Robert Woods, Littleton, CO (US)

(73) Assignee: Sierra Space Corporation, Broomfield, CO (US)

( * ) Notice: Subject to any disclaimer, the term of this patent is extended or adjusted under 35 U.S.C. 154(b) by 252 days.

(21) Appl. No.: 17/733,769

(22) Filed: Apr. 29, 2022

(65) Prior Publication Data

US 2023/0002086 A1 Jan. 5, 2023

Related U.S. Application Data

(60) Provisional application No. 63/217,152, filed on Jun. 30, 2021.

(51) Int. Cl.
*F16M 13/02* (2006.01)
*B64G 1/60* (2006.01)

(52) U.S. Cl.
CPC ............... *F16M 13/02* (2013.01); *B64G 1/60* (2013.01)

(58) Field of Classification Search
CPC . F16M 13/02; B64G 1/10; B64G 1/12; B64G 1/22; B64G 1/222; B64G 1/2227; B64G 1/2228; B64G 1/56; B64G 1/60; B64G 1/66
See application file for complete search history.

(56) References Cited

U.S. PATENT DOCUMENTS 4,562,979 A * 1/1986 Taylor .................... B64G 99/00
220/8
4,880,186 A * 11/1989 Mecca ..................... B64G 1/12
244/158.3

(Continued)

FOREIGN PATENT DOCUMENTS

| CN | 111071483 A | 4/2020 |
| CN | 112357117 A | 2/2021 |
| WO | WO-2019/120205 A1 | 6/2019 |

*Primary Examiner* — Eret C McNichols
(74) *Attorney, Agent, or Firm* — Mintz Levin Cohn Ferris Glovsky and Popeo, P.C.

(57) ABSTRACT

Methods, devices, and systems are described for a mounting flange and bracket for a space habitat. The bracket system couples a bladder of a space habitat to a cylindrical core. The bracket system includes a soft goods layer configured to cover the bladder of the space habitat. The bracket system includes a mounting flange configured to couple at an end of the cylindrical core. The mounting flange includes a lip extending around the mounting flange. The bracket system includes a bracket configured to connect the soft goods layer to the mounting flange. The bracket has a first end and a second end. The first end includes a pin configured to couple to the soft goods layer. The second end includes a protrusion configured to latch to the lip of the mounting flange. In some variations, a cap is configured to be coupled to the outer side of the mounting flange.

14 Claims, 7 Drawing Sheets

(56) References Cited

U.S. PATENT DOCUMENTS

| | | | | |
|---|---|---|---|---|
| 4,911,380 | A * | 3/1990 | Regipa | B64B 1/58 244/31 |
| 6,231,010 | B1 | 5/2001 | Schneider et al. | |
| 6,321,746 | B1 * | 11/2001 | Schneider | A61G 10/026 128/205.26 |
| 6,547,189 | B1 * | 4/2003 | Raboin | B64G 1/12 244/158.3 |
| 6,974,109 | B1 * | 12/2005 | Mezits | B64G 1/52 244/158.3 |
| 7,509,774 | B1 * | 3/2009 | Johnson | B64G 1/12 52/2.25 |
| 8,578,663 | B2 | 11/2013 | Bigelow | |
| 10,836,515 | B2 * | 11/2020 | Doggett | B64G 1/10 |
| 2005/0120638 | A1 * | 6/2005 | Bigelow | B63B 7/082 52/2.25 |
| 2019/0009932 | A1 * | 1/2019 | Doggett | B64G 1/66 |
| 2022/0396378 | A1 * | 12/2022 | Hatsell | B64G 1/2227 |

* cited by examiner

MOUNTING FLANGE AND BRACKET FOR A SPACE HABITAT

CROSS-REFERENCE TO RELATED APPLICATIONS

This application claims priority to U.S. Provisional Application No. 63/217,152 entitled "MOUNTING FLANGE AND BRACKET FOR A SPACE HABITAT" and filed on Jun. 30, 2021, the disclosure of which is incorporated herein by reference in its entirety.

STATEMENT OF GOVERNMENT SPONSORED SUPPORT

Certain aspects of the subject matter described herein were developed with U.S. Government support under Contract No. 80HQTR17C0009 awarded by NASA. The U.S. Government has certain rights in the invention.

TECHNICAL FIELD

The present disclosure relates generally to space structures, and more particularly, to a mounting flange and bracket for a space habitat.

BACKGROUND

Space habitats are needed to support mission activities in space. A space habitat may be formed from a core and a bladder surrounding the core. The bladder and a soft goods layer may be stowed uninflated around the core within a launch vehicle. Once in space, the space habitat may inflate and become pressurized to support mission activities in space. The pressurized bladder may be susceptible to air leaks, especially near the core and bladder interface. Air leaks pose significant safety concerns to inhabitants and equipment. In addition, the bladder may be stressed under the weight of heavy loads from inside the space habitat, which causes an uneven stress distribution across the bladder.

SUMMARY

The present disclosure provides methods, systems, and articles of manufacture for a mounting flange and bracket for a space habitat.

In one aspect, there is provided a bracket system for coupling a bladder of a space habitat to a cylindrical core. The bracket system includes a soft goods layer configured to cover the bladder of the space habitat. The bracket system includes a mounting flange configured to couple at an end of the cylindrical core. The mounting flange includes a lip extending around the mounting flange. The bracket system includes a bracket configured to connect the soft goods layer to the mounting flange. The bracket has a first end and a second end. The first end includes a pin configured to couple to the soft goods layer. The second end includes a protrusion configured to latch to the lip of the mounting flange.

In some variations, the mounting flange further comprises an inner side facing the cylindrical core, the bladder configured to cover a portion of the inner side of the mounting flange; and an outer side opposite the inner side, the outer side including the lip extending around the mounting flange, wherein the mounting flange extends around a circumference of the cylindrical core. Additionally, the mounting flange further comprises a sloped top side having non-perpendicular corners with the inner side and the outer side, the sloped top side sloping upwards from the inner side of the mounting flange to the outer side of the mounting flange, the non-perpendicular corners configured to minimize pressure against the bladder, wherein the bladder is configured to cover the sloped top side.

Further, the soft goods layer further comprises a strap configured to wrap around the pin to secure the bracket to the soft goods layer, the strap configured to pass through an opening between the pin and a base of the bracket. Additionally, the strap is configured to cover a portion of the bladder, the strap being configured to weave through a plurality of hoop straps extending in a direction approximately perpendicular to the strap. In some variations, the bracket system further comprises at least one aperture at the bracket, the at least one aperture configured to receive a bolt for coupling the bracket to the mounting flange; and a plurality of external openings extending around the outer side of the mounting flange, the plurality of external openings configured to receive the bolt for coupling the bracket to the mounting flange, wherein the at least one aperture at the bracket and at least one external opening of the plurality of external openings are configured to align to receive the bolt for coupling the bracket to the mounting flange.

In some variations, the plurality of external openings are spaced a predetermined length from an edge of the mounting flange, and wherein the lip is proximate to a mounting flange circumference. Additionally, the bracket further includes a flat bottom side of the bracket configured to be flush with mounting flange, the flat bottom side of the bracket configured to abut a first side of the lip of the mounting flange, wherein the protrusion is configured to rotate about the pin such that the protrusion abuts an opposing second side of the lip. Further, the protrusion is configured to align to a curvature of the lip and wherein the pin is detachable.

In some variations, the bracket system further comprises a clamping ring configured to extend around the inner side of the mounting flange, the clamping ring configured to secure the bladder to the mounting flange; and a plurality of internal openings extending around the inner side of the mounting flange, the plurality of internal openings configured to receive a clamping ring bolt for coupling the clamping ring to the inner side of the mounting flange to secure the bladder to the mounting flange. Additionally, the clamping ring is further configured to cover an O-ring extending along the inner side of the mounting flange. Further, the bracket system further comprises a cap configured to be coupled to the outer side of the mounting flange and the cylindrical core, the cap including a cylindrical end that is configured to be aligned with the mounting flange; a first portion of the cap configured to overlap the outer side of the mounting flange; and a second portion of the cap configured to overlap the end of the cylindrical core.

Additionally, the first portion of the cap is configured to cover an O-ring extending along the outer side of the mounting flange. Further, the first portion of the cap includes an opening to receive a bolt for coupling the cap to the mounting flange and wherein the cap is a vestibule configured to be a transition chamber between the space habitat and an external space structure.

In another aspect, there is provided a bracket for coupling a bladder to a core of a space habitat. The bracket includes a base; an aperture in the base, the aperture configured to receive a bolt for coupling the bracket to a mounting flange at the core; a pin coupled to the base, the pin configured to receive a strap restraining the bladder; and a protrusion coupled to the base, the protrusion configured to overhang a lip at the mounting flange of the core.

In some variations, the pin is at a first end of the base and the protrusion is at an opposing second end of the base. Additionally, the bracket further comprises at least two members extending horizontally beyond the first end of the base, the at least two members being separated by the pin and configured to secure the pin to the bracket. Further, the base has a flat bottom side configured to be flush with an outer side of the mounting flange, the flat bottom side of the bracket configured to abut a first side of the lip of the mounting flange, and wherein the protrusion is configured to rotate about the pin such that the protrusion abuts an opposing second side of the lip. In some variations, the aperture is configured to align with a mounting flange aperture, the mounting flange aperture, and the aperture configured to receive the bolt for coupling the bracket to the mounting flange at the core.

In yet another aspect, there is a coupling system for coupling a vestibule of a space habitat to a cylindrical core. The coupling system includes the cylindrical core having an end; a mounting flange configured to couple at the end of the cylindrical core; and the vestibule configured to be coupled to and align with an outer side of the mounting flange and the end of the cylindrical core; a first portion of the vestibule configured to overlap the outer side of the mounting flange; and a second portion of the vestibule configured to overlap the end of the cylindrical core.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

Figure 1A:
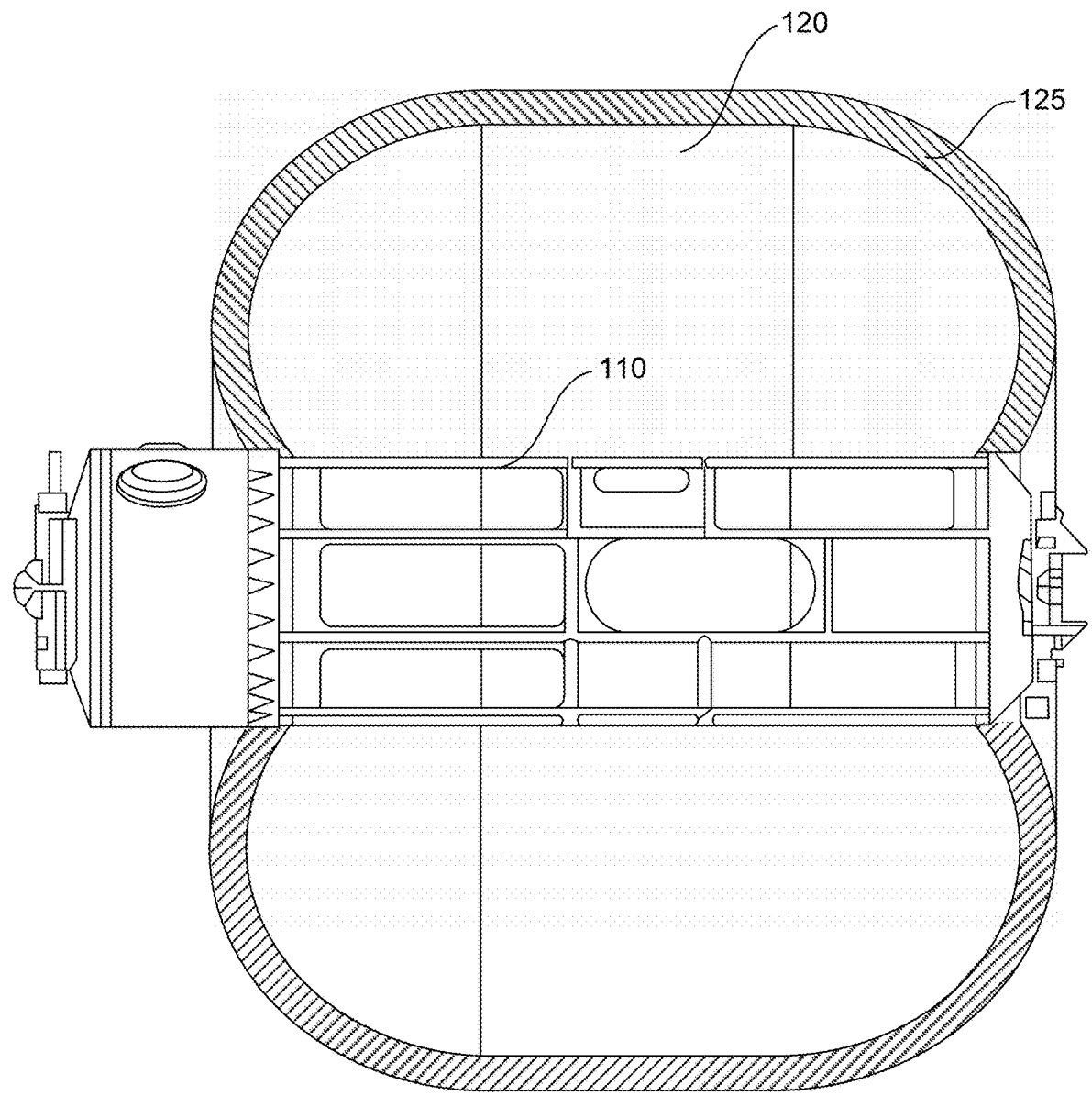
FIG. 1A depicts an example of a diagram representative of a cross-section of a space habitat having a core and bladder.

The space habitat may be formed from a core and a bladder surrounding the core. Together, the core and bladder may provide a habitat for humans that shelters against space debris and radiation. The bladder may expand around the area between the two ends of the core and retain oxygen in an airtight environment. A soft goods layer, such as a webbing, may cover the bladder for protection and increase the likelihood of an even pressure load distribution across the bladder. The soft goods layer may include a webbing of straps in a basket-weave configuration to maintain the shape of the bladder and to prevent straining of the bladder. But the combination of the soft goods layer and the bladder may place significant strain on the core, especially at the ends where the core connects to the bladder. A hardware interface is necessary to keep the bladder and core conjoined under this pressure. Currently, any separation of the bladder and core would result in air leakage and compromise the safety of the inhabitants and equipment.

A hardware interface at the bladder and core should prevent air leaks and separation of the bladder and core at the connecting point of the core and the bladder. Further, the hardware interface should be configured to interface with the soft goods layer, which may include a vast array of straps that cover and hold the bladder together. Moreover, the hardware interface should be configured to interface with a cylindrical hollow core with openings at both ends through which cargo and personnel may pass. The core or bladder may have structural failure from significant pulling strain from the bladder and the soft goods pulling at the endpoints of the core. This pulling strain may increase as the bladder is pressurized. The strain on the core may cause air leaks near the core and the buckling of the core. Thus, a hardware interface between the cylindrical hollow core and the soft goods layer is required to properly secure the bladder to the core and maintain a safe pressurized space habitat.

The mounting flange and bracket here solves the problem of the immense strain on the core and bladder and the need to maintain an airtight seal within the habitat. Unlike previous solutions, the mounting flange and the bracket may interface between the array of straps covering the bladder and the cylindrical hollow core. The mounting flange and bracket may increase the likelihood that the bladder is secured to the core. The mounting flange and a bracket may also increase the likelihood of the bladder remaining airtight under full pressure.

The bracket and the mounting flange may provide an interface between the array of straps covering the bladder and the hollow rigid cylindrical shape of the core. The mounting flange may connect to an end of the core. The mounting flange may include a lip on an outer side and various openings at the internal and external sides for bolts to interconnect the bladder and the core. The bracket may include two ends: one end or end region to connect to an array of straps covering the bladder and the other end or end region to connect to the mounting flange. The bracket may have a protrusion that goes over the lip of the mounting flange. The bracket may be further secured by two bolts to the various apertures at the mounting flange.

A clamping ring may seal the bladder to the mounting flange. The clamping ring may cover an O-ring situated between the clamping ring and the mounting flange. The mounting flange may be connected to the core via a cap or vestibule. The cap or vestibule may overlap with the core and the mounting flange. The cap or vestibule may run parallel to the mounting flange to secure the mounting flange and core together. Overall, the interplay between the bracket, the mounting flange, the clamping ring, and the cap secures the bladder and core together under immense tension.

The methods, systems, and apparatuses described herein are for a mounting flange and a bracket to maintain the bladder secure to the core and a safe airtight space habitat. The various embodiments described herein also create an interlocking play of the mounting flange, the core, and the cap.

FIG. 1A depicts an example of a diagram representative of a cross-section of a space habitat having a core and bladder. The space habitat may be formed from a core 110 and a bladder 120 coupled to the core 110. The bladder 120 may connect to the far ends of the core 110 such as at opposed ends or opposed regions of the core. The bladder 120 may expand out from the core 110 when pressurized. The bladder 120 may have a toroid shape about the core 110 in a non-limiting example. The bladder 120 may be covered by a liner 125. The liner 125 may protect the bladder 120 from the relatively rough surface of the soft goods layer 150.

The core 110 may be a rigid frame for the space habitat. The core 110 may have a cylindrical shape with a hollow interior. The hollow interior may allow cargo and persons to pass from one end of the core 110 to the other end of the core 110. The core 110 may include openings at the far ends of the core 110. The openings may allow the space habitat to interface with other space structures to receive cargo or personnel. For example, the core 110 may be attached to a vestibule for receiving cargo. In another example, the core 110 may include a pressurization cap to maintain the pressure inside of the core 110.

The bladder 120 may be connected to the ends of the cylindrical core 110. The bladder 120 may be stored uninflated at the core 110 to minimize its footprint prior to launch. Following launch, the bladder 120 may inflate under pressure. The pressurized bladder 120 may support human activity in space. The bladder 120 may be stressed by the pressurization, which potentially poses significant safety concerns to inhabitants and equipment. For example, an air leak may result at the interface between the core 110 and the bladder 120.

With reference still to FIG. 1A, the bladder 120 may be a component for retaining gas. The bladder 120 may create an airtight seal for the space habitat. The bladder 120 may have a low gas permeability. The bladder 120 may maintain pressurized air inside the habitat to support human life. The bladder 120 may be symmetrical about the core 110. For example, the bladder 120 may retain a toroid shape about the core 110. In another example, the bladder 120 may have a spherical shape about the core 110. In some embodiments, the bladder 120 may bulge outward at the area proximate to the core 110. In some embodiments, the bladder 120 may have the shape of a wheel at the portion furthest from the core 110.

The bladder 120 may be pressurized to fill a soft goods layer 150. The soft goods layer 150 may be a restraint on the shape and size of the bladder 120. For example, the bladder 120 may be pressurized to fill the contours of an axial and hoop webbing restraint. The bladder 120 may be slightly oversized relative to the soft goods layer 150 to prevent overinflating. The bladder 120 may elongate to increase the likelihood that the bladder 120 reaches the constraining contours of the axial and hoop webbing restraints.

Figure 1B:
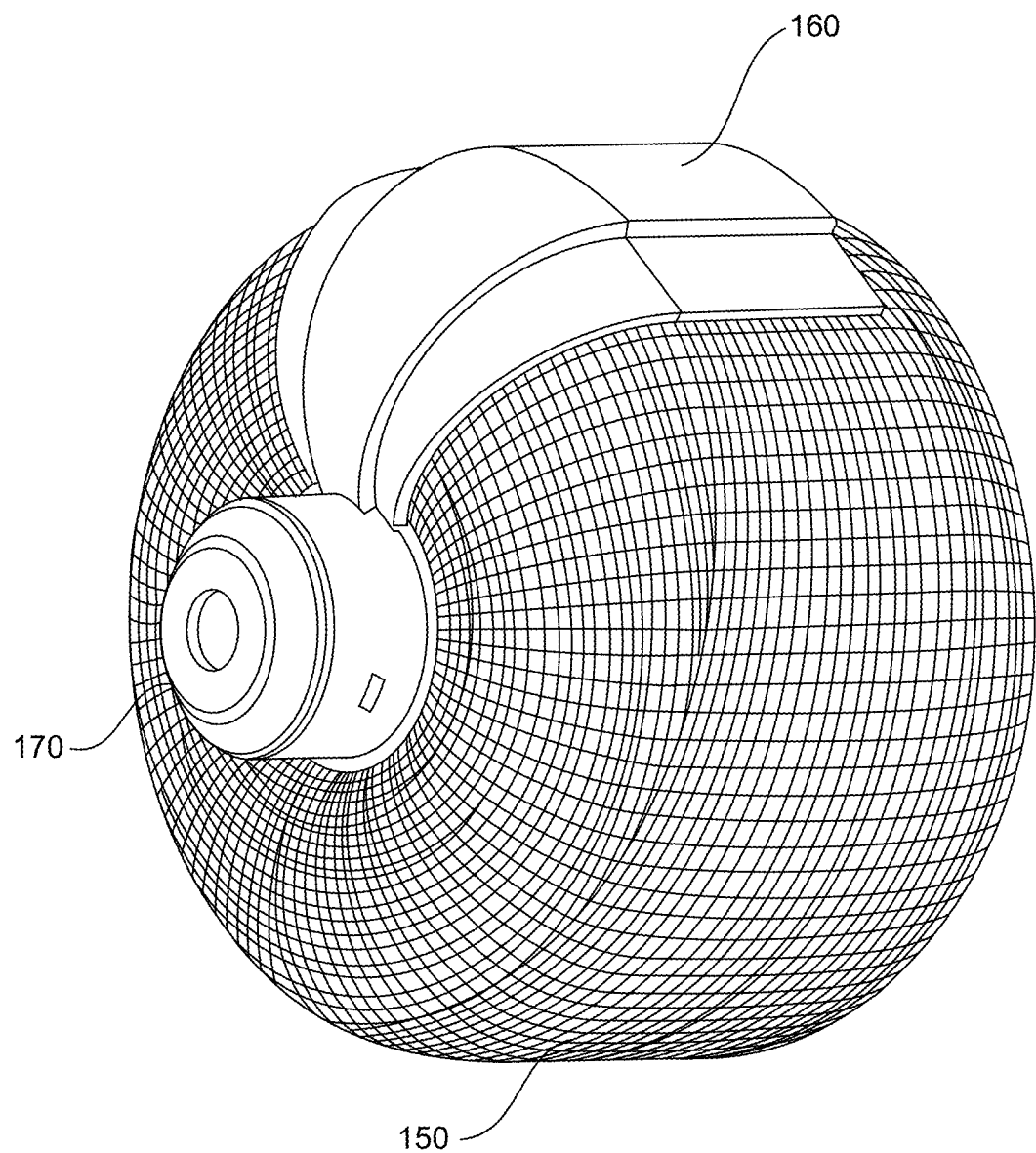
FIG. 1B depicts an example of a diagram representative of a space habitat including a core attached to a vestibule and a bladder covered with a soft goods layer and a debris shield.

FIG. 1B depicts an example of a diagram representative of a space habitat including a core 110 attached to a vestibule and a bladder 120 covered with a soft goods layer 150 and a debris shield 160. The soft goods layer 150 may cover the bladder 120 and be interposed between the debris shield 160 and the bladder 120.

The soft goods layer 150 may be wrapped around the bladder 120. Additionally, and/or alternatively, the soft goods layer 150 may be wrapped around the liner 125. The soft goods layer 150 may comprise an axial and hoop webbing. The axial and hoop webbing may reinforce the bladder 120 and prevent uneven stress distribution across the bladder 120. The axial and hoop webbing may be configured to increase the likelihood that the bladder 120 retains its shape. The axial and hoop webbing may be woven together to create an even stress distribution across the bladder 120. For example, the axial webbing may alternate between going over and under the hoop webbings. Additionally, and/or alternatively, the hoop webbing may alternate between going over and under the axial webbings. Various weave patterns may be created between the axial and hoop webbings. The axial and hoop webbing may be spaced around the circumference of the bladder 120. The axial and hoop webbing may be made of Vectran. A hoop strap may be joined to the strap 230 (e.g., axial strap) with a stitching, an adhesive, and/or the like. Similarly, the strap 230 (e.g., axial strap) may be joined to the hoop strap with a stitching, an adhesive, and/or the like.

A vestibule may be connected to either side of the core 110. The vestibule may be an interface for connecting to an external space structure. The vestibule may be a transition chamber between the space habitat and the external space structure. Either side of the vestibule may include a selectively removable air pressure door configured to seal off pressure between the vestibule and the external spacecraft.

Figure 2:
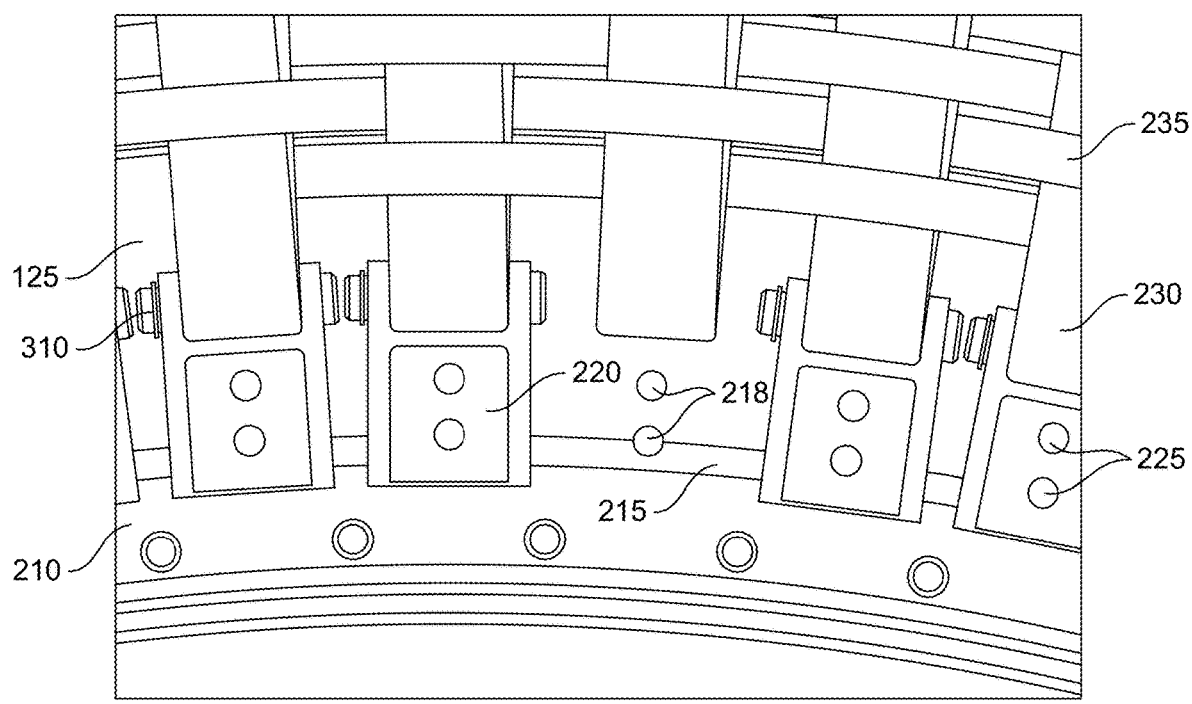
FIG. 2 depicts an example of a diagram representative of a mounting flange and a bracket connection.

FIG. 2 depicts an example of a diagram representative of a mounting flange 210 and a connected bracket 220. The mounting flange 210 and bracket 220 may solve the problem of the immense strain on the core 110 and bladder 120 and the need to maintain an airtight seal within the space habitat. The mounting flange 210 and the bracket 220 may interface between the array of straps covering the bladder 120 and the cylindrical hollow core 110. The mounting flange 210, the bracket 220, and the soft goods layer 150 may form a system for coupling a bladder 120 of a space habitat to a cylindrical core 110. The bracket 220 may couple the soft goods layer 150 to the mounting flange 210.

The bracket 220 and the mounting flange 210 system may provide an interface between the array of straps covering the bladder 120 and the hollow rigid cylindrical shape of the core 110. The mounting flange 210 may connect to an end of the cylindrical core 110. The mounting flange 210 may include a lip 215 on an outer side and various apertures at the inner and outer sides of the mounting flange 210 for bolts to interconnect the bladder 120 and the core 110. The bracket 220 may include two ends: one end region to connect to an array of straps covering the bladder 120 and the other end region to connect to the mounting flange 210. The bracket 220 may have a protrusion that goes over the lip 215 of the mounting flange 210. The bracket 220 may be further secured by two bolts to the various apertures at the mounting flange 210.

In an example embodiment, the mounting flange 210 may be a flat, annular ring and have a hollow center. The mounting flange 210 may be configured to fit over an end of the cylindrical core 110. The mounting flange 210 may have an outer diameter and an inner diameter. The inner diameter of the mounting flange 210 may be approximately the same diameter as the core diameter. The mounting flange 210 may extend outwards in a direction opposite the direction in which the core 110 extends. The mounting flange 210 may be approximately parallel to the open end of the cylindrical core 110. The mounting flange 210 may be configured to slide down the length of the cylindrical core 110. In some embodiments, the mounting flange 210 may be located at the end rings of the core 110.

With reference still to FIG. 2, the mounting flange 210 may have a bottom side. The bottom side may be configured to be flush with an outer surface of the cylindrical core 110. Alternatively, a gap may exist between the bottom side of the mounting flange 210 and the outer surface of the cylindrical core 110. The mounting flange 210 may be wider near the bottom side than the top side. Alternatively, the mounting flange 210 may be narrower near the bottom side than the top side. The bottom side of the mounting flange 210 may be configured to receive the end of the core 110. The mounting flange 210 may be made of steel, aluminum alloy, titanium alloy, or a steel alloy.

As discussed, the mounting flange 210 may include the lip 215. The bladder 120 and the soft goods layer 150 are configured to attach to the lip 215 with a bracket 220. The lip 215 may extend around the mounting flange 210 and may extend beyond an outer side of the mounting flange 210. The lip 215 may extend around the circumference of the mounting flange 210. Alternatively, the lip 215 may extend around the mounting flange 210 at a predetermined distance from the circumference. Additionally, and/or alternatively, the lip 215 may extend around the mounting flange 210 at a predetermined distance from the center of the mounting flange 210. The lip 215 may have a consistent width as it extends around the mounting flange 210. The lip 215 may have a top surface and side surfaces. The side surfaces may extend from the outer side of the mounting flange 210 at one end and meet the top surface at the opposing end. The top surface may be flat and extend the two side surfaces. The top surface and the side surfaces may be approximately perpendicular to each other. The bladder 120 and the soft goods layer 150 may couple to the mounting flange 210 via the lip 215.

The mounting flange 210 may include apertures for receiving bolts. For example, the mounting flange 210 may include a plurality of external openings 218 at the outer side of the mounting flange 210 that are configured to receive a bolt for coupling the bracket 220 to the mounting flange 210. In another example, a plurality of internal openings may extend around the inner side of the mounting flange 210 to receive a bolt for coupling the clamping ring 610 to the mounting flange 210. The plurality of internal openings may be configured to receive a clamping ring bolt for coupling the clamping ring 610 to the inner side of the mounting flange 210 to secure the bladder 120 to the mounting flange 210. The mounting flange 210 may include various grooves or depressions that extend around the mounting flange 210. For example, the mounting flange 210 may include a depression at or near the bottom side of the mounting flange 210. The depression may extend around the mounting flange 210 at or near the bottom side of the mounting flange 210. The depression may be configured to receive a cap 620 or a vestibule 170.

With reference still to FIG. 2, the bracket 220 may be configured to connect the soft goods layer 150 to the mounting flange 210. The bracket 220 may include one end region configured to interface with the soft goods layer 150. The bracket 220 may include an opposite end region configured to interface with the mounting flange 210. The bracket 220 is configured to handle the tension that the strap 230 (which is an element of the soft goods layer 150) places on the bracket 220. The bracket 220 is configured to be secured to the mounting flange 210 to restrain the soft goods layer 150.

The bracket 220 may include a first end region. The first end region may include two members 320 and a pin. The strap 230 may be configured to wrap around the pin. The two members 320 may be configured to secure the pin. The pin may be selectively detachable. The bracket 220 may include a second end region. The second end region may include a protrusion configured to latch to the lip 215 of the mounting flange 210. The protrusion may extend from a surface of the second end region such that the protrusion overlaps the lip 215 of the mounting flange 210. The protrusion may be configured to be flush with a side surface of the lip 215. The second end region may be configured to be flush with a top surface of the second end region.

The bracket 220 may include at least one aperture 225. The at least one aperture 225 may be configured to receive a bolt for coupling the bracket 220 to the mounting flange 210. The at least one aperture 225 may be configured to align with at least one external opening of the plurality of external openings 618 at the mounting flange 210. The at least one aperture 225 of the bracket 220 may be configured to receive a bolt. The bolt may be configured to pass through the at least one aperture 225 and the external opening at the mounting flange 210 to couple the bracket 220 to the mounting flange 210. The aperture may include female threading to receive the threading at the bolt. In some embodiments, two apertures at the bracket 220 may be configured to align with the two external openings 218 at the mounting flange 210. The two bolts may be configured to pass through the at least one aperture 225.

With reference still to FIG. 2, the bracket 220 may be coupled to a strap 230. The strap 230 may be configured to cover a portion of the bladder 120. Additionally, and/or alternatively, the strap 230 may be configured to cover a portion of the liner 125. The strap 230 may be one of many straps in a soft goods layer 150. The soft goods layer 150 may cover the bladder 120 for protection and increase the likelihood of an even load distribution across the bladder 120. The soft goods layer 150 may include a webbing of straps in a basket-weave configuration to maintain the shape of the bladder 120 and to prevent straining of the bladder 120. The strap 230 may wrap around the bladder 120 from one end of the core 110 to the opposite end of the core 110. The strap 230 may be configured to wrap around a bracket 220.

The strap 230 may weave a hoop strap 235 to create a webbing. For example, the axial webbing may alternate between going over and under the hoop straps. Additionally, and/or alternatively, the hoop webbing may alternate between going over and under the axial webbings. Various weave patterns may be created between the axial and hoop webbings. The axial and hoop webbing may be spaced around the circumference of the bladder 120. The axial and hoop webbing may be made of Vectran. A hoop strap 235 may be joined to the strap 230 (e.g., axial strap) with a stitching, an adhesive, and/or the like. Similarly, the strap 230 (e.g., axial strap) may be joined to the hoop strap 235 with a stitching, an adhesive, and/or the like.

Figure 3:
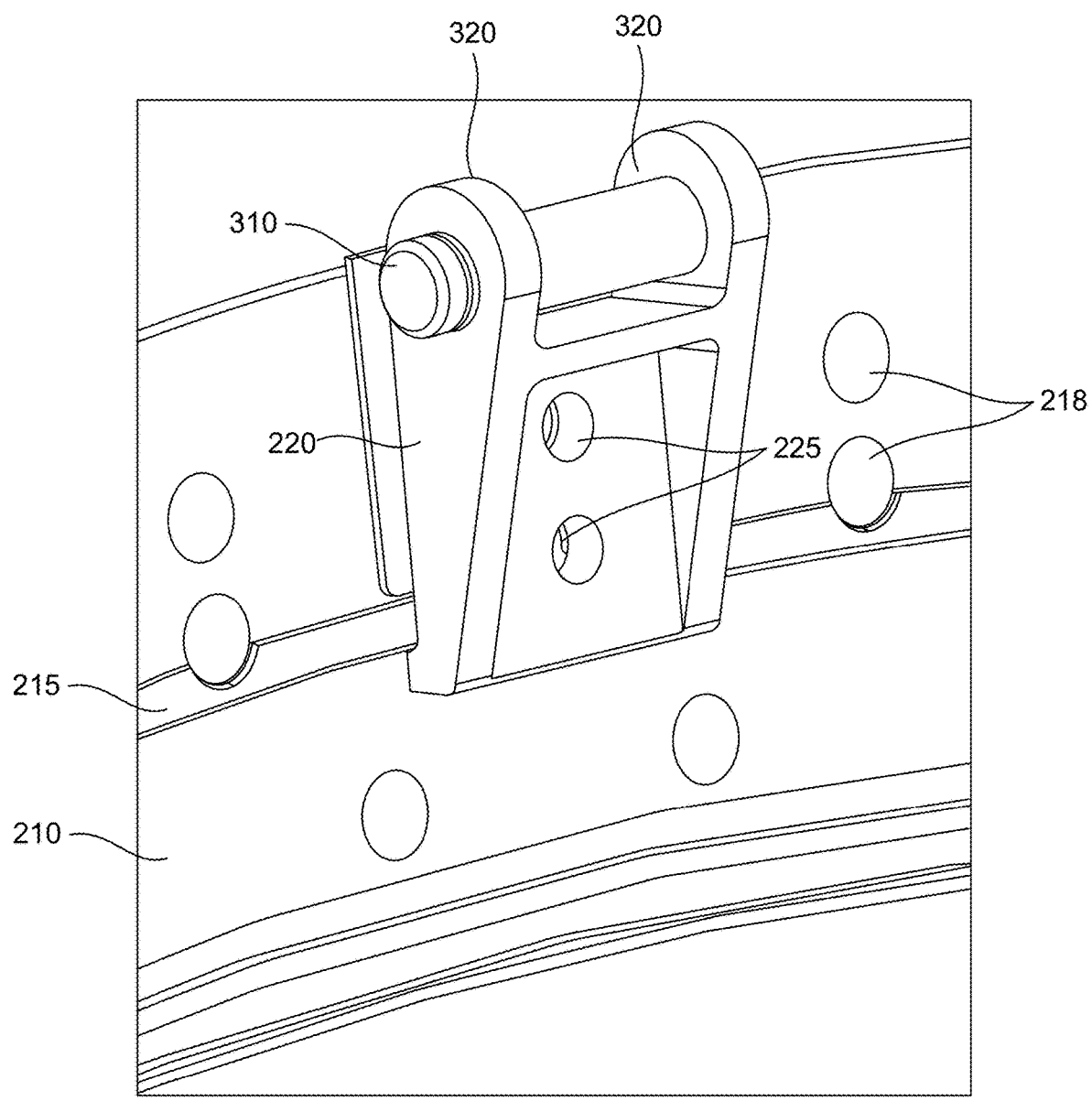
FIG. 3 depicts an example of a diagram representative of a bracket with a first end configured to couple to the soft goods layer and a second end configured to couple to the mounting flange.

FIG. 3 depicts an example of a diagram representative of a bracket 220 with a first end configured to couple to the soft goods layer 150 and a second end configured to couple to the mounting flange 210. The bracket 220 may prevent air leaks and separation of the bladder 120 and core 110 at the mounting flange 210. The bracket 220 may be configured to maintain the soft goods layer 150 connected to the mounting flange 210. The bracket 220 may withstand significant pulling strain from the bladder 120 and the soft goods at the endpoints of the core 110.

The bracket 220 may include a base. The base may include a flat or contoured surface that may be mounted to the mounting flange 210. In some embodiments, the base may be mounted to the outer side of the mounting flange 210. The flat surface of the base may be flush with the outer side of the mounting flange 210. The base may extend from the lip 215 of the mounting flange 210 to an outer edge of the mounting flange 210. The flat surface may be on the backside of the base. The base may include the at least one aperture 225 configured to receive a bolt for coupling the bracket 220 to the mounting flange 210. The at least one aperture 225 at the base may be configured to align with at least one external opening at the mounting flange 210.

With reference still to FIG. 3, the bracket 220 may include two members 320. The two members 320 may extend horizontally from the base. The two members 320 may be at an end region of the bracket 220. For example, the two members 320 may be at a first end region of the bracket 220 to couple to the soft goods layer 150. The two members 320 may extend from opposite ends of the bracket 220. For example, the two members 320 may extend from the corners of first end region of the bracket 220. The two members 320 may extend at an approximately perpendicular angle from its respective side at the corners of the bracket 220. The two members 320 may be spaced apart from each other by the pin. Two members 320 may be configured to sustain a pin.

Each of the members may include an opening with the pin 310. The opening may be configured to receive the pin 310. The pin 310 may extend at an approximately perpendicular angle from the two members 320. The pin 310 may be configured to fit in the opening of the two members 320. The pin 310 may be configured to be detachable from the two members 320. The pin 310 may extend beyond the opening in the two members 320 to the other side. The pin 310 may have a thicker diameter at the portion extending beyond the opening than the portion between the two members 320. In some embodiments, the pin 310 may be cylindrical to fit in the openings of the two members 320. Additionally, and/or alternatively, the pin 310 may have a rectangular shape, a square shape, a hexagonal shape, and/or the like. The alternative shapes of the pin 310 may increase the friction of the webbing loop 250 around the pin 310. The pin 310 may be a clevis pin configured to engage webbing loop 250 that is sewn to the webbing restraint.

With reference still to FIG. 3, the bracket 220 may include a protrusion 350. The protrusion may be located at a second end region of the bracket 220 opposing the first end region. The protrusion may be configured to latch to the lip 215 of the mounting flange 210. Additionally, and/or alternatively, the protrusion may be configured to overhang the lip 215 of the mounting flange 210. The protrusion may be configured to align to a curvature of the lip 215. The protrusion may be configured to rotate about the pin such that the protrusion abuts an opposing second side of the lip 215. The protrusion may be configured to be flush with a side surface of the lip 215. The protrusion may be configured to be in contact with the outer surface of the mounting flange 210 while overhanging or latching to the lip 215 of the mounting flange 210.

Figure 4:
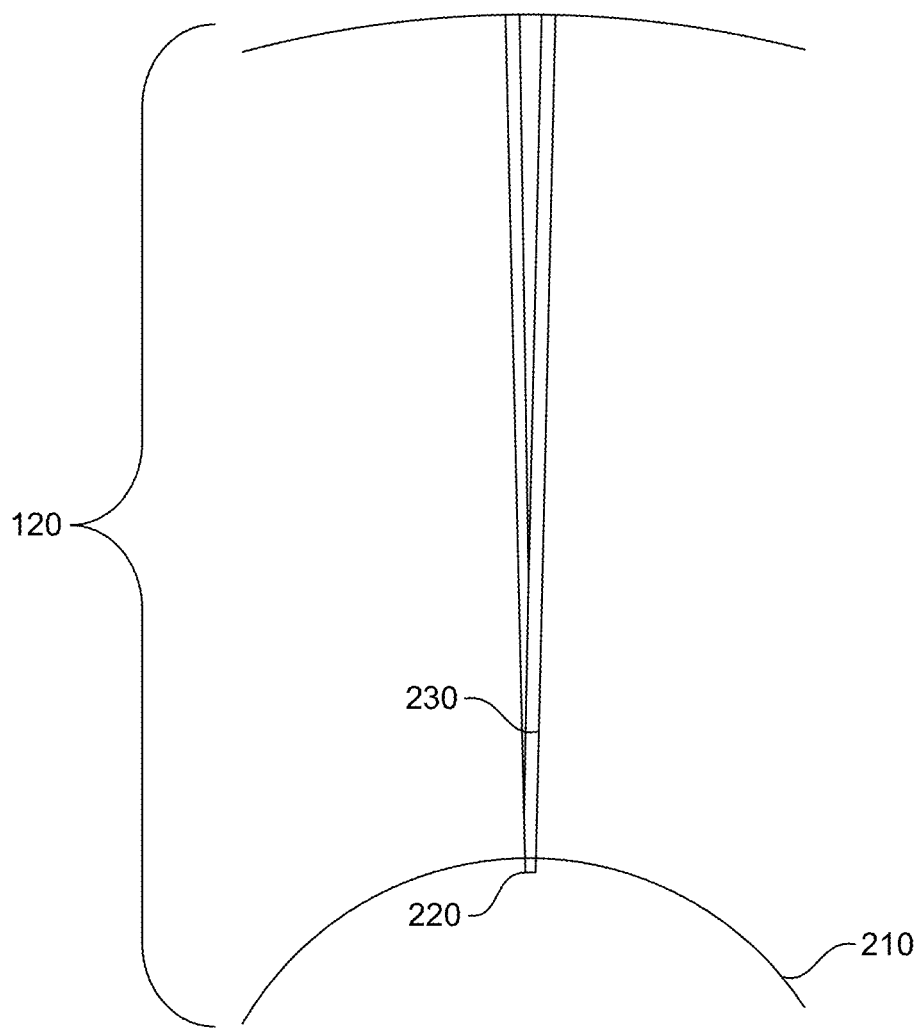
FIG. 4 depicts an example of a diagram representative of a strap configured to cover a portion of the bladder.

FIG. 4 depicts an example of a diagram representative of a strap 230 configured to cover a portion of the bladder 120. The strap 230 may be configured to wrap around the bladder 120. The strap 230 may be a portion of the soft goods layer 150. The bladder 120 may be pressurized to cause tension on the strap 230. The strap 230 may be a restraint on the shape and size of the bladder 120. The strap 230 may form the contour of the pressurized bladder 120.

The strap 230 may have two end regions. The two end regions may converge to connect to a bracket 220. As the two end regions of the strap 230 wrap span across the bladder 120 from the bracket 220, the two ends may spread out horizontally, where each end region covers a different portion of the bladder 120. The two end regions of the strap 230 may converge again at the opposite side of the core 110 and connect to a second bracket. In some embodiments, the two end regions may overlap each other at or near the bracket 220. The two end regions may separate at a middle portion of the bladder 120.

The strap 230 may connect to the bracket 220. The strap 230 may be wrapped around the pin 310 of the bracket 220. The strap 230 may include a loop through which the pin passes. The strap 230 may be configured to pass through an opening between the pin and a base of the bracket 220. The strap 230 may attach to the bracket 220 by sliding the pin through the first member of the bracket 220, then the strap 230, and then the second member of the bracket 220. The strap 230 may detach to the bracket 220 by removing the pin from the second member of the bracket 220, then the loop at the strap 230, and then the first member of the bracket 220. The strap 230 may be two separate straps that are sewn or stitched together at the bracket 220. The strap 230 may be configured to weave through a plurality of hoop straps extending in a direction approximately perpendicular to the strap 230. The strap 230 may be configured to attach to the hoop strap 235 via a stitching, an adhesive, and/or the like.

Figure 5:
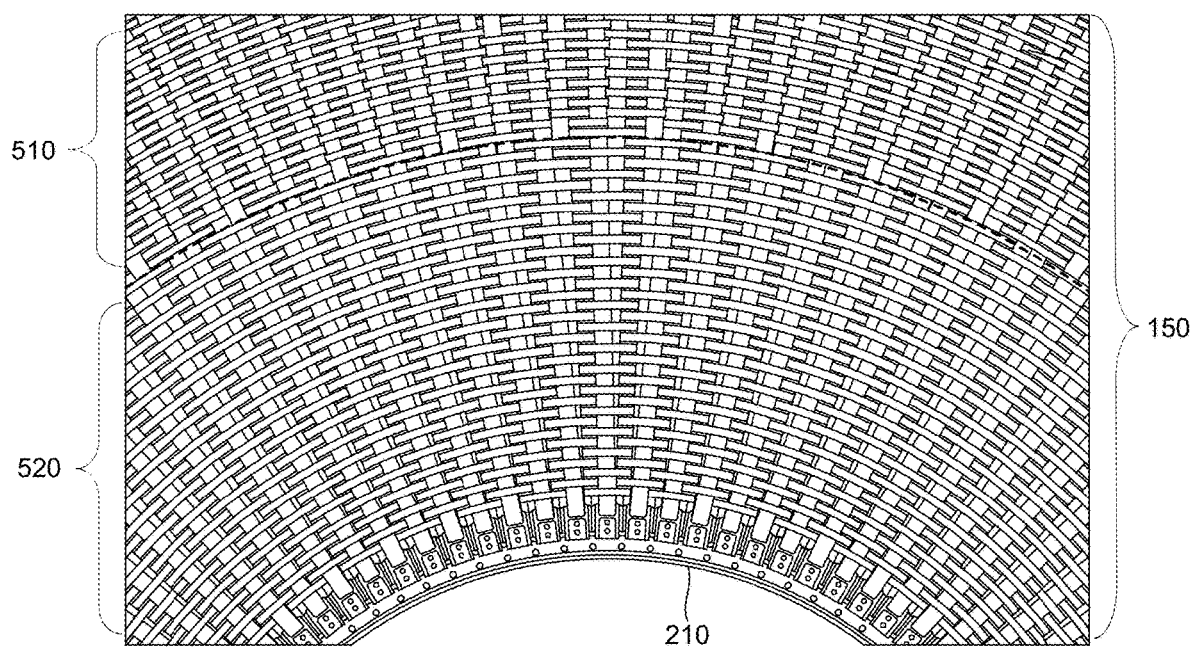
FIG. 5 depicts an example of a diagram representative of a soft goods layer covering the bladder and connected to the mounting flange with a plurality of brackets.

FIG. 5 depicts an example of a diagram representative of a soft goods layer 150 covering the bladder 120 and connected to the mounting flange 210 with a plurality of brackets. The bracket 220 may be attached to a large grid of interweaving axial and hoop strap 235. Multiple bracket 220 fixtures may extend around the mounting flange 210 to couple the soft goods layer 150 to the mounting flange 210.

In some embodiments, the pin may have a strap 230 or webbing loop. The webbing loop may be configured to wrap around the pin to secure the strap 230 (e.g., axial strap) to the soft goods layer 150. The webbing loop may include one end for wrapping around the pin 310 and another end for attaching to the soft goods layer 150. The end for attaching to the soft goods layer 150 may be attached via a fastener, ties, staples, stitches, knots, and/or the like. The webbing loop 250 may be made of Vectran. In some embodiments, the internal pressure on the soft goods layer 150 may result in the tensile loading of the bracket 220. The internal pressure on the soft goods layer 150 may result in the shifting of the tension across the soft goods layer 150 onto the mounting flange 210 via the bracket 220. The webbing loop may have different wrapping configurations with different straps. For example, the webbing loop may have a first wrapping configuration 510 where the hoop strap 235 go over one axial strap and under one axial strap. In another example, the webbing loop may have a second wrapping configuration 520 where the hoop strap 235 go over two axial straps and then under axial two straps.

Figure 6:
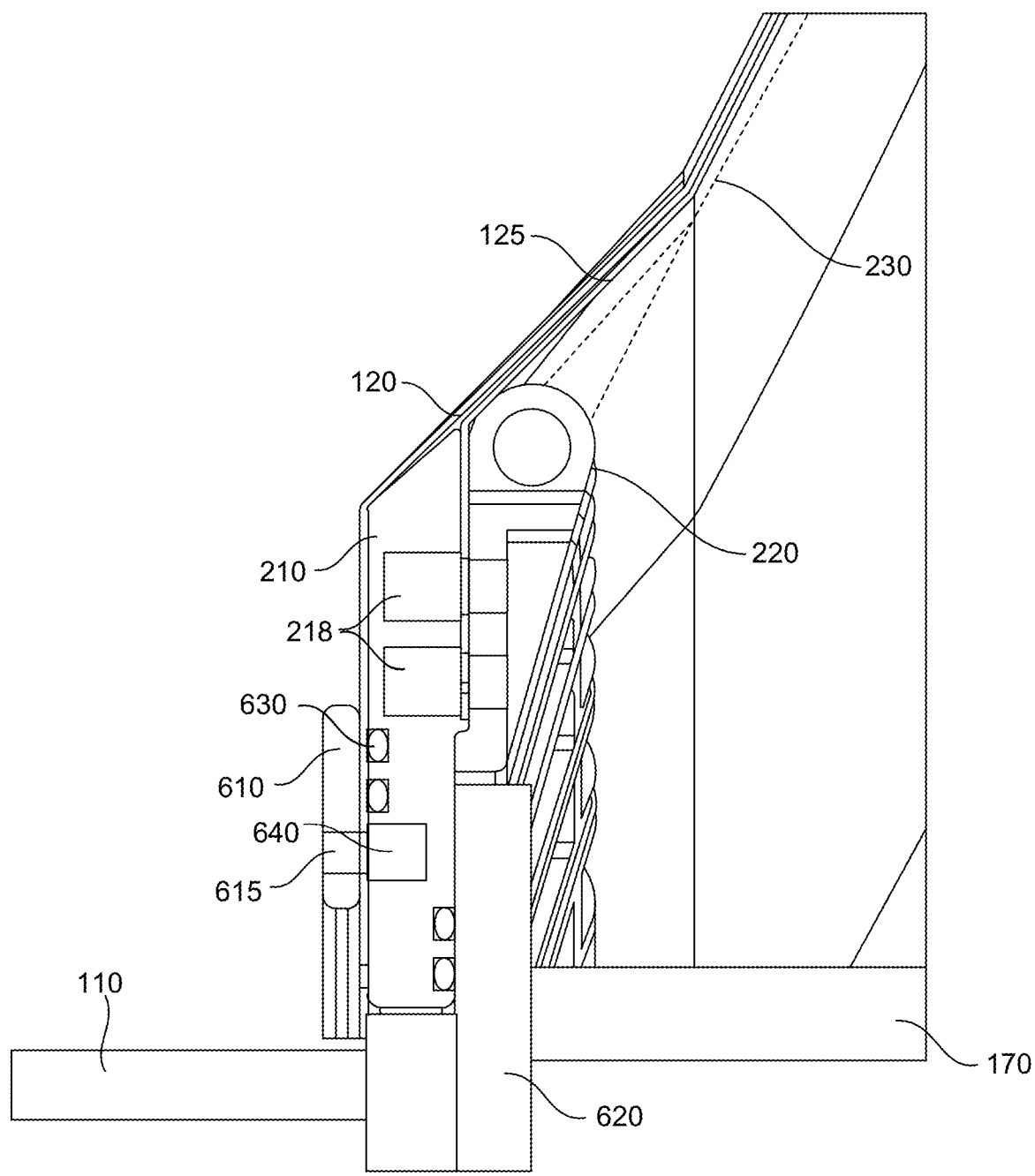
FIG. 6 depicts another example of a diagram representative of a cross-section of a mounting flange and bracket connection.

FIG. 6 depicts another example of a diagram representative of a cross-section of a mounting flange 210 and a bracket 220 connected to the mounting flange 210. A clamping ring 610 may seal the bladder 120 to the mounting flange 210. The clamping ring 610 may cover an O-ring 630 situated between the clamping ring 610 and the mounting flange 210. The mounting flange 210 may be connected to the core 110 via a cap 620 or vestibule 170. Portions of the cap 620 or vestibule 170 may overlap with the core 110 and the mounting flange 210. Portions of the cap 620 or vestibule 170 may run parallel to the mounting flange 210 to secure the mounting flange 210 and core 110 together. The interplay between the bracket 220, the mounting flange 210, the clamping ring 610, and the cap 620 may secure the bladder 120 and core 110 together under immense tension.

A clamping ring 610 may be configured to secure the bladder 120 to the mounting flange 210. The clamping ring 610 may be configured to extend around the inner side of the mounting flange 210 to fix the bladder 120 between the clamping ring 610 and the mounting flange 210. The clamping ring 610 may be a flat, annular ring and have a hollow center. The clamping ring 610 may have an outer diameter and an inner diameter. The inner diameter of the clamping ring 610 may be approximately the same diameter as the core diameter. The clamping ring 610 may extend outwards in a direction opposite the direction in which the core 110 extends. The clamping ring 610 may be approximately parallel to the open end of the cylindrical core 110. A bottom side of the clamping ring 610 may be configured to be flush with an outer surface of the cylindrical core 110. Alternatively, a gap may exist between the bottom side of the clamping ring 610 and the outer surface of the cylindrical core 110. The clamping ring 610 may be made of steel, aluminum alloy, titanium alloy, or a steel alloy.

The clamping ring 610 may include apertures at the clamping ring 610. For example, a plurality of clamping ring openings may extend around the side of the mounting flange 210. The plurality of clamping ring openings may pass through the entire width of the clamping ring 610. The plurality of clamping ring openings may be configured to receive a clamping ring bolt for coupling the clamping ring 610 to the inner side of the mounting flange 210 to secure the bladder 120 to the mounting flange 210. The bolt may be configured to pass through the opening of the clamping ring opening 615 of the plurality of clamping ring openings and the internal opening 640 of the plurality of internal openings at the mounting flange 210 to couple the clamping ring 610 to the mounting flange 210. The bolt may be configured to first pass through an aperture at the clamping ring 610, then pass through the bladder 120, and then pass through the internal opening 640 of the plurality of internal openings at the mounting flange 210. In some embodiments, the bolt may pass through the aperture of the clamping ring 610 and then pass through the internal opening 640 of the plurality of internal openings at the mounting flange 210. The plurality of internal openings may extend around the inner side of the mounting flange 210 in a circular pattern (not shown in the cross-section view of FIG. 6). Similarly, the plurality of clamping ring openings may extend around the side of the mounting flange 210 in a circular pattern (not shown in the cross-section view of FIG. 6).

The clamping ring 610 may be configured to cover an O-ring 630 at the mounting flange 210. The O-ring 630 may be positioned between the bladder 120 and the mounting flange 210. The clamping ring 610 may be configured to hold the bladder 120 against the O-ring 630 to maintain an airtight seal at the O-ring 630. The clamping ring 610 may be configured to create an airtight seal with the O-ring 630 by coupling to the inner side of the mounting flange 210. The O-ring 630 may be placed in a recess of the mounting flange 210 and extend around the inner side of the mounting flange 210. The recesses for the O-ring 630 may extend around the mounting flange 210 at a predetermined distance from the circumference of the mounting flange 210.

The cap 620 may be configured to secure the mounting flange 210 to the core 110. The cap 620 may be configured to couple to the outer side of the mounting flange 210 and the core 110. The cap 620 may be configured to be aligned with the mounting flange 210 and the core 110. The cap 620 may include two portions. The first portion of the cap 620 may be configured to overlap the outer side of the mounting flange 210. The second portion of the cap 620 may be configured to overlap the end of the cylindrical core 110.

The cap 620 may include apertures at the first portion of the cap 620. The apertures may be configured to receive a bolt for coupling the cap 620 to the outer side of the mounting flange 210 to secure the cap 620 to the mounting flange 210. The bolt may be configured to pass through the aperture and through the outer openings at the mounting flange 210 to couple the cap 620 to the mounting flange 210. In some embodiments, the bolt may pass through the aperture of the cap 620 and then pass through the outer openings on the outer side of the mounting flange 210.

The cap 620 may be configured to cover an O-ring 630 at the mounting flange 210. The O-ring 630 may wrap around the outer side of the mounting flange 210. The O-ring 630 may be positioned between the cap 620 and the mounting flange 210. The cap 620 may be configured to hold the O-ring 630 against the mounting flange 210 to maintain an airtight seal. The O-ring 630 may be placed in a recess of the mounting flange 210 and extend around the outer side of the mounting flange 210. The recesses for the O-ring 630 may extend around the mounting flange 210 at a predetermined distance from the circumference of the mounting flange 210.

The cap 620 may include apertures at the second portion of the cap 620. The apertures may be configured to receive a bolt for coupling the cap 620 to the outer side of the core 110 to secure the cap 620 to the core 110. The bolt may be configured to pass through the aperture and through openings at the core 110 to couple the cap 620 to the core 110. In some embodiments, the bolt may pass through the aperture of the cap 620 and then pass through the openings on the core 110.

The core 110 may be configured to couple to the cap 620. The core 110 may include apertures at the core 110. For example, the core 110 may include a plurality of external core openings at the outer side of the core 110 that is configured to receive a bolt for coupling the cap 620 to the core 110. The core 110 may include various grooves or depressions that extend around the core 110 for receiving the cap 620. For example, the core 110 may include a depression at or near the end of the core 110. The depression may extend around the core 110 at or near the end of the core 110.

In some embodiments, the cap 620 may be a portion of the vestibule 170. The vestibule 170 may be coupled to an end of the cap 620. The vestibule 170 may be a volume of the space habitat. The vestibule 170 may be configured to couple to a payload external to the space habitat. The vestibule 170 may be an interface for docking to an external spacecraft. For example, the vestibule 170 may allow the core to dock to another spacecraft or space vessel. The vestibule 170 may be configured to load and unload cargo between the core and the external spacecraft. The vestibule 170 may be a separate pressurized volume that includes an airlock with a pressure barrier between the core and the vestibule 170. The vestibule 170 may be a transition chamber between the space habitat and the external space structure. Either side of the vestibule 170 may include a selectively removable air pressure door configured to seal off pressure between the vestibule 170 and the external spacecraft.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

While the foregoing is directed to implementations of the present disclosure, other and further implementations of the disclosure may be devised without departing from the basic scope thereof, and the scope thereof is determined by the claims that follow.

What is claimed is:

1. A bracket system for coupling a bladder of a space habitat to a cylindrical core, the bracket system comprising:
   a soft goods layer configured to cover the bladder of the space habitat;
   a mounting flange configured to couple at an end of the cylindrical core, the mounting flange including a lip extending around the mounting flange; and
   a bracket configured to connect the soft goods layer to the mounting flange, the bracket having a first end and a second end, the first end including a pin configured to couple to the soft goods layer and the second end including a protrusion configured to latch to the lip of the mounting flange.

2. The bracket system of claim 1, wherein the mounting flange further comprises:
   an inner side facing the cylindrical core, the bladder configured to cover a portion of the inner side of the mounting flange; and
   an outer side opposite the inner side, the outer side including the lip extending around the mounting flange,
   wherein the mounting flange extends around a circumference of the cylindrical core.

3. The bracket system of claim 2, wherein the mounting flange further comprises:
   a sloped top side having non-perpendicular corners with the inner side and the outer side, the sloped top side sloping upwards from the inner side of the mounting flange to the outer side of the mounting flange, the non-perpendicular corners configured to minimize pressure against the bladder,
   wherein the bladder is configured to cover the sloped top side.

4. The bracket system of claim 2, further comprising:
   at least one aperture at the bracket, the at least one aperture configured to receive a bolt for coupling the bracket to the mounting flange; and
   a plurality of external openings extending around the outer side of the mounting flange, the plurality of external openings configured to receive the bolt for coupling the bracket to the mounting flange, wherein the at least one aperture at the bracket and at least one external opening of the plurality of external openings are configured to align to receive the bolt for coupling the bracket to the mounting flange.

5. The bracket system of claim 4, wherein the plurality of external openings are spaced a predetermined length from an edge of the mounting flange, and wherein the lip is proximate to a mounting flange circumference.

6. The bracket system of claim 2, further comprising:
a clamping ring configured to extend around the inner side of the mounting flange, the clamping ring configured to secure the bladder to the mounting flange; and
a plurality of internal openings extending around the inner side of the mounting flange, the plurality of internal openings configured to receive a clamping ring bolt for coupling the clamping ring to the inner side of the mounting flange to secure the bladder to the mounting flange.

7. The bracket system of claim 6, wherein the clamping ring is further configured to cover an O-ring extending along the inner side of the mounting flange.

8. The bracket system of claim 2, further comprising:
a cap configured to be coupled to the outer side of the mounting flange and the cylindrical core, the cap including a cylindrical end that is configured to be aligned with the mounting flange;
a first portion of the cap configured to overlap the outer side of the mounting flange; and
a second portion of the cap configured to overlap the end of the cylindrical core.

9. The bracket system of claim 8, wherein the first portion of the cap is configured to cover an O-ring extending along the outer side of the mounting flange.

10. The bracket system of claim 8, wherein the first portion of the cap includes an opening to receive a bolt for coupling the cap to the mounting flange and wherein the cap is a vestibule configured to be a transition chamber between the space habitat and an external space structure.

11. The bracket system of claim 1, wherein the soft goods layer further comprises:
a strap configured to wrap around the pin to secure the bracket to the soft goods layer, the strap configured to pass through an opening between the pin and a base of the bracket.

12. The bracket system of claim 11, wherein the strap is configured to cover a portion of the bladder, the strap being configured to weave through a plurality of hoop straps extending in a direction approximately perpendicular to the strap.

13. The bracket system of claim 1, wherein the bracket further includes:
a flat bottom side of the bracket configured to be flush with mounting flange, the flat bottom side of the bracket configured to abut a first side of the lip of the mounting flange,
wherein the protrusion is configured to rotate about the pin such that the protrusion abuts an opposing second side of the lip.

14. The bracket system of claim 1, wherein the protrusion is configured to align to a curvature of the lip and wherein the pin is detachable.

* * * * *